United States Patent
Daigle, Jr.

[11] Patent Number: 6,131,321
[45] Date of Patent: Oct. 17, 2000

[54] SOLAR LIGHTING SYSTEM

[76] Inventor: Walter T. Daigle, Jr., 9158 W. McCarty St., Indianapolis, Ind. 46231

[21] Appl. No.: 09/336,450

[22] Filed: Jun. 21, 1999

[51] Int. Cl.[7] .............................. G09F 15/00; F21L 13/00
[52] U.S. Cl. .............................. 40/612; 40/463; 345/207; 362/183; 362/812; 315/159
[58] Field of Search ............... 40/463, 564, 612; 345/207; 362/157, 183, 812; 315/156, 159, 313

[56] References Cited

U.S. PATENT DOCUMENTS

| | | | |
|---|---|---|---|
| 3,892,081 | 7/1975 | Goral | 40/612 X |
| 4,242,614 | 12/1980 | Vatis et al. | 315/153 |
| 4,441,143 | 4/1984 | Richardson, Jr. | 362/183 |
| 5,467,076 | 11/1995 | Ruocco et al. | 40/560 X |
| 5,532,677 | 7/1996 | Miller | 340/286.01 |
| 5,637,964 | 6/1997 | Hakkarainen et al. | 315/295 |
| 5,819,455 | 10/1998 | Tsuda | 40/612 X |

*Primary Examiner*—Brian K. Green
*Attorney, Agent, or Firm*—Daniel J. O'Connor

[57] ABSTRACT

A solar lighting system and method which is especially useful for street and address signs. An upper unit contains a solar energy collector, a storage battery and a light sensor to turn the light on and off as needed. A system to bypass the light sensor control includes a radio frequency(RF) radio receiver which responds to a transmitter. The lighting unit may be economically manufactured and installed on new or existing lighting fixtures.

1 Claim, 1 Drawing Sheet

SOLAR LIGHTING SYSTEM

BACKGROUND AND OBJECTS OF THE INVENTION

The use of solar energy collection devices has been generally known as shown by the art in U.S. Patent Office Class 126.

The use of solar-powered lighting systems have also been known in the art.

Accordingly, it is an object of the present invention to set forth a novel solar lighting system which is especially adapted for street and address signs.

It is a further object of the invention to demonstrate a novel solar lighting system which may be applied to new or existing lighting fixtures.

It is also an object of the invention to show a control system contained within a single unit for economy of manufacture and use.

These and other objects and advantages of the invention will be apparent to those of skill in the art from the description which follows.

PRIOR ART PATENTS AND DESIGNS

U.S. Patent Office Class 126 shows a number of different solar collector systems and methods of operation and control.

U.S. Class 40, which includes sign exhibiting, contains U.S. Pat. No. 5,007,190 issued in 1991 for a solar powered house number indicating device. This patent discloses substantially different structures and operating functions as compared to the presently described invention.

SUMMARY OF THE INVENTION

An upper container and collector unit has a solar energy collector and battery storage means placed therein.

The container further has a light sensor to normally control the on-off functions of a lighted sign.

An RF radio receiver is utilized to over-ride the on-off functions when such is deemed desirable by the user.

The system is adaptable to street and address signs and may be readily installed into a lamp post structure.

The elevated position of the collector and container unit optimizes solar collection and reduces possible tampering with the unit. The elevated position also enables optimal use of the RF radio receiver to control the system as needed.

BRIEF DESCRIPTION OF THE DRAWING FIGURES

DESCRIPTION OF A PREFERRED EMBODIMENT AND METHOD

Figure 1:
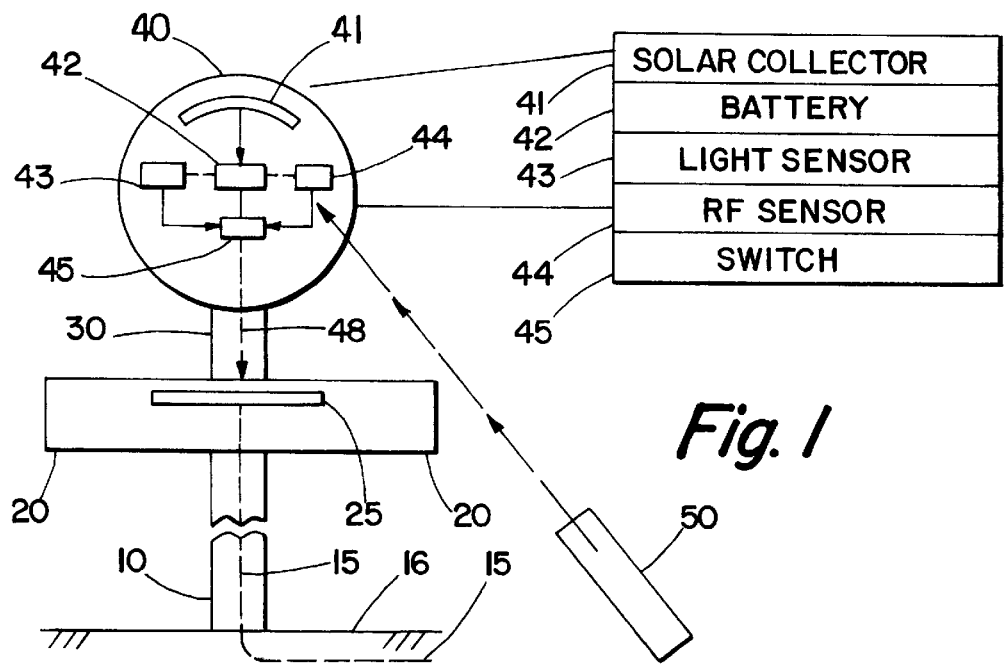
FIG. 1 shows the invention as applied to a street sign or lamp post and schematically illustrates the position of the primary elements of the design.

Referring to drawing FIG. 1, a street sign or lamp post assembly 10 is shown having an illuminated sign 20 thereon. Power to a sign such as this is frequently supplied via electric cable 15 from an underground location 16.

In the present invention, power is supplied to a light 25 via an upper container and solar collector 40 so that the lower cable 15 is not required.

The container 40 has photovoltaic solar collector 41 mounted therein which is connected to a storage battery 42.

Electric power to the light 25 is supplied via an on-off switch 45 and electric line 48 in tube 30.

The on-off switch 45 is normally controlled by a light sensor 43 such that the switch 45 is turned on or off depending upon the outdoor light levels.

The overall shape of the container-collector unit 40 is generally spherical so that snow or rain does not collect on top of the unit.

In accord with the present invention, the operation of the on-off light switch 45 may be effected by an RF receiver and sensor 44. RF sensor 44 is activated and controlled via RF(radio frequency) remote transmitter 50.

Figure 2:
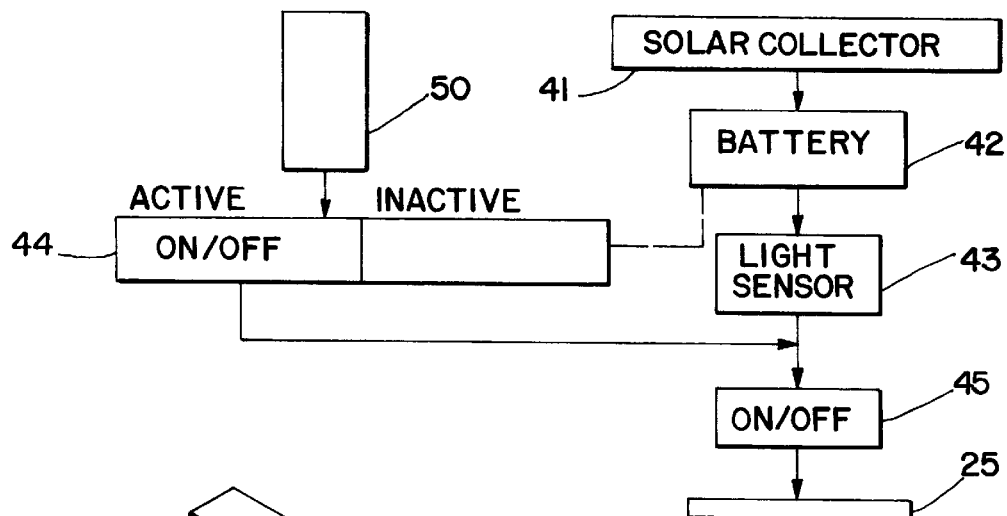
FIG. 2 shows the possible method steps of the invention in block diagram form.

As illustrated in the method of control steps of FIG. 2, the RF receiver 44 may be placed in an active or inactive mode via the RF transmitter 50.

When the receiver 44 is in the inactive mode, the operation of light switch 45 is controlled via the light sensor 43.

When the RF sensor 44 is in the active mode, the light sensor 43 is effectively bypassed so that the RF sensor 44 controls the operation of the light switch 45.

Thus, for convenience of operation, the street sign light 25 may be controlled via the remote RF transmitter 50.

By deactivating the RF sensor 44, the system is returned to the normal operational control by the light sensor element 43.

The overall system and method described thus results in a highly effective control for an illuminated street name sign without requiring the use of an underground wiring system.

Figure 3:
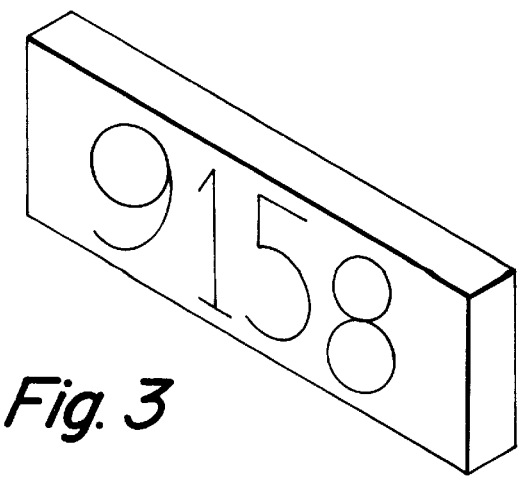
FIG. 3 shows another possible application of the inventive principles when used in a self-contained unit.

The principles described herein may also be applied to such items as a residential address sign as part of a self-contained unit as indicated in the drawing FIG. 3.

While a particular embodiment and method has been shown and described, it is intended in this specification to cover all equivalent structures and methods which would reasonably occur to those of skill in the art.

I claim:

1. An illumination and control system in combination with an exterior street sign(20) comprising:

a lower post(10) supporting said street sign, said street sign including a street sign light(25), a tube element(30) above said street sign, a spherical container element(40) above said tube element, said spherical container element(40) having a solar collector(41) therein and a storage battery(42) therein, a switch(45) within said spherical container(40) for controlling the flow of electricity to said street sign light(25), a light sensor(43) also within said spherical container(40) for normally activating said switch(45), wherein said spherical container(40) also has an RF-radio frequency sensor(44) therein for controlling the flow of electricity from said storage battery(42) to said street sign light(25) when it is desired to bypass the normal activation by said light sensor(43), said illumination and control system further including an external RF transmitter(50) for activating said RF-radio frequency sensor(44), said illumination and control system providing means whereby an underground wire power system(15) may be easily replaced by the spherical container element (40).

* * * * *